United States Patent
Hsu (10) Patent No.: US 10,344,711 B2
(45) Date of Patent: Jul. 9, 2019

(54) SYSTEM AND METHOD OF ALLEVIATING BLADE FLUTTER

(71) Applicant: Rolls-Royce Corporation, Indianapolis, IN (US)

(72) Inventor: Kwen Hsu, Carmel, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 537 days.

(21) Appl. No.: 14/992,719

(22) Filed: Jan. 11, 2016

(65) Prior Publication Data
US 2017/0198723 A1 Jul. 13, 2017

(51) Int. Cl.
| F02C 7/045 | (2006.01) |
| F02K 3/06 | (2006.01) |
| F04D 29/52 | (2006.01) |
| F04D 29/54 | (2006.01) |
| F04D 29/66 | (2006.01) |

(52) U.S. Cl.
CPC ............... *F02K 3/06* (2013.01); *F02C 7/045* (2013.01); *F04D 29/522* (2013.01); *F04D 29/545* (2013.01); *F04D 29/665* (2013.01); *F05D 2240/12* (2013.01)

(58) Field of Classification Search
CPC .... F04D 29/668; F04D 19/002; F04D 29/329; F04D 29/38; F04D 29/522; F04D 29/541; F04D 29/526; F02K 3/06; F05D 2220/36; F05D 2260/96
USPC .......................................................... 415/1
See application file for complete search history.

(56) References Cited

U.S. PATENT DOCUMENTS

| 2,043,416 A | * | 6/1936 | Lueg ...................... F01N 1/065 181/197 |
| 2,783,008 A | * | 2/1957 | Bodine, Jr. ............. B64C 21/00 244/130 |
| 2,989,136 A | * | 6/1961 | Wohlberg ............ G10K 11/172 181/224 |
| 4,044,203 A | * | 8/1977 | Swinbanks .......... F16L 55/0333 381/71.5 |
| 4,254,619 A | * | 3/1981 | Giffin, III ............... F02K 3/075 244/55 |
| 4,844,692 A | * | 7/1989 | Minkkinen ............. F01D 11/08 415/208.1 |
| 5,386,689 A | * | 2/1995 | Bozich ................. G10K 11/178 381/71.11 |

(Continued)

FOREIGN PATENT DOCUMENTS

EP    3064779 A1 * 9/2016 ........... F04D 27/001

OTHER PUBLICATIONS

Vahdati, M. et al., "Influence of Intake on Fan Blade Flutter," Journal of Turbomachinery, Aug. 2015, vol. 137, 081002-1, 10pgs.

*Primary Examiner* — Jason D Shanske
*Assistant Examiner* — Brian Christopher Delrue
(74) *Attorney, Agent, or Firm* — Duane Morris LLP (57) ABSTRACT

A modified inlet region of a turbofan engine for reducing or eliminating turbofan flutter. The modified inlet region is defined by annular inside surface and a fan. The modified inlet region is upstream and co-axial with the fan. A plurality of fins are disposed circumferentially around the annular inside surface and extend radially into the modified inlet region. Each fin may be attached normal to the annular inside surface or at an angle. The plurality of fins serve to disrupt the propagation of acoustic reflections leading to turbofan flutter.

7 Claims, 11 Drawing Sheets

(56) References Cited

U.S. PATENT DOCUMENTS

| | | | | |
|---|---|---|---|---|
| 5,478,199 A * | 12/1995 | Gliebe | B64D 33/02 | 415/119 |
| 5,515,444 A * | 5/1996 | Burdisso | G10K 11/178 | 381/71.5 |
| 5,952,621 A * | 9/1999 | Curtis | B64D 33/02 | 181/213 |
| 5,966,452 A * | 10/1999 | Norris | B06B 1/20 | 381/71.1 |
| 6,434,239 B1 * | 8/2002 | DeLuca | G10K 11/1788 | 381/71.1 |
| 6,973,193 B1 * | 12/2005 | Tse | B64D 33/06 | 181/204 |
| 7,648,330 B2 * | 1/2010 | Schwaller | F02C 7/045 | 415/1 |
| 7,819,224 B2 * | 10/2010 | Borchers | F01D 25/30 | 181/213 |
| 2002/0117579 A1 * | 8/2002 | Kotoulas | F16F 15/02 | 244/1 N |
| 2003/0056493 A1 * | 3/2003 | Jannetta | F02K 1/72 | 60/226.2 |
| 2005/0118028 A1 * | 6/2005 | Matheny | F01D 5/147 | 416/219 R |
| 2009/0053058 A1 * | 2/2009 | Kohlenberg | B64D 33/04 | 415/227 |
| 2009/0245997 A1 * | 10/2009 | Hurwitz | F01D 17/08 | 415/1 |
| 2010/0276007 A1 * | 11/2010 | Hendricks | F02C 7/04 | 137/15.1 |
| 2011/0120080 A1 * | 5/2011 | Schwark, Jr. | F02K 1/09 | 60/226.3 |
| 2012/0269619 A1 * | 10/2012 | Johann | F04D 29/164 | 415/182.1 |
| 2014/0212261 A1 * | 7/2014 | Schwarz | F04D 27/004 | 415/1 |
| 2016/0084265 A1 * | 3/2016 | Yu | F04D 29/542 | 415/1 |
| 2016/0258440 A1 * | 9/2016 | Henry | F04D 27/001 | |

* cited by examiner

SYSTEM AND METHOD OF ALLEVIATING BLADE FLUTTER

FIELD OF THE DISCLOSURE

The present disclosure relates generally to turbine engines, and more specifically to a flow path for a turbine engine.

BACKGROUND

Turbine engines provide energy for a wide range of uses. A typical turbine engine comprises a compressor, a combustor, a high-pressure turbine, and a low-pressure turbine. These components are typically contained within a casing which defines both an internal flow path of air through the engine and the external dimensions of the engine. In some applications, additional components are included to define all or part of the internal flow path.

Examples of turbine engines include turbofan, turbojet, turboshaft, and turboprop engines. In turbofan engines, a fan is typically located forward of the compressor, combustor, and turbines. The fan produces the majority of the engine's thrust during operation.

Axial flow engine fans are susceptible to aeroelastic instability, commonly called stall flutter or fan blade flutter, which occurs at part speed operating conditions near the stall boundary. Flutter is a self-excited vibration of a set of fan blades on a disk (rotor) and has the potential to escalate to a strength that can cause serious and sometimes catastrophic damage to turbine engine components.

One mechanism that can affect flutter is acoustic reflection within a nacelle which circumferentially surrounds the turbine fan. In some instances such acoustic reflection is in-phase with pressure oscillations experienced at the fan blade surface which exacerbates vibration at certain frequencies. Some acoustic reflections propagate axially (i.e. along the axis of rotation of the fan rotor) and circumferentially (i.e. about the axis of rotation of the fan rotor, such that any axially-forward propagation is in a spinning or corkscrew fashion).

To control the acoustic reflection propagation is an important design consideration in modern turbine engines because manipulating acoustic reflection propagation can reduce or eliminate flutter, which greatly reduces cost and frequency of maintenance of the fan and turbine engine, improves fan performance, and also greatly reduces the likelihood of serious or even catastrophic damage to turbine engine components.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The present disclosure is directed to various embodiments of a turbine engine inlet flow path geometry. Although the present disclosure presents embodiments of flow paths of systems or equipment having rotating blades such as inlet fan blades in a turbine engine, it would be evident to one of skill in the art that the same or similar flow paths could be used for similar systems employing rotating blades in which flutter is a design concern.

This disclosure presents embodiments to alter or alleviate propagation of acoustic reflection which can, under certain operating conditions, lead to fan blade flutter. More specifically, this disclosure is directed to a turbine engine inlet flow path geometry which incorporates a plurality of fins at the nacelle to interrupt acoustic reflection propagation. Detailed descriptions of the disclosed turbine engine inlet flow path geometry, and advantages thereof, are presented below.

Figure 1:
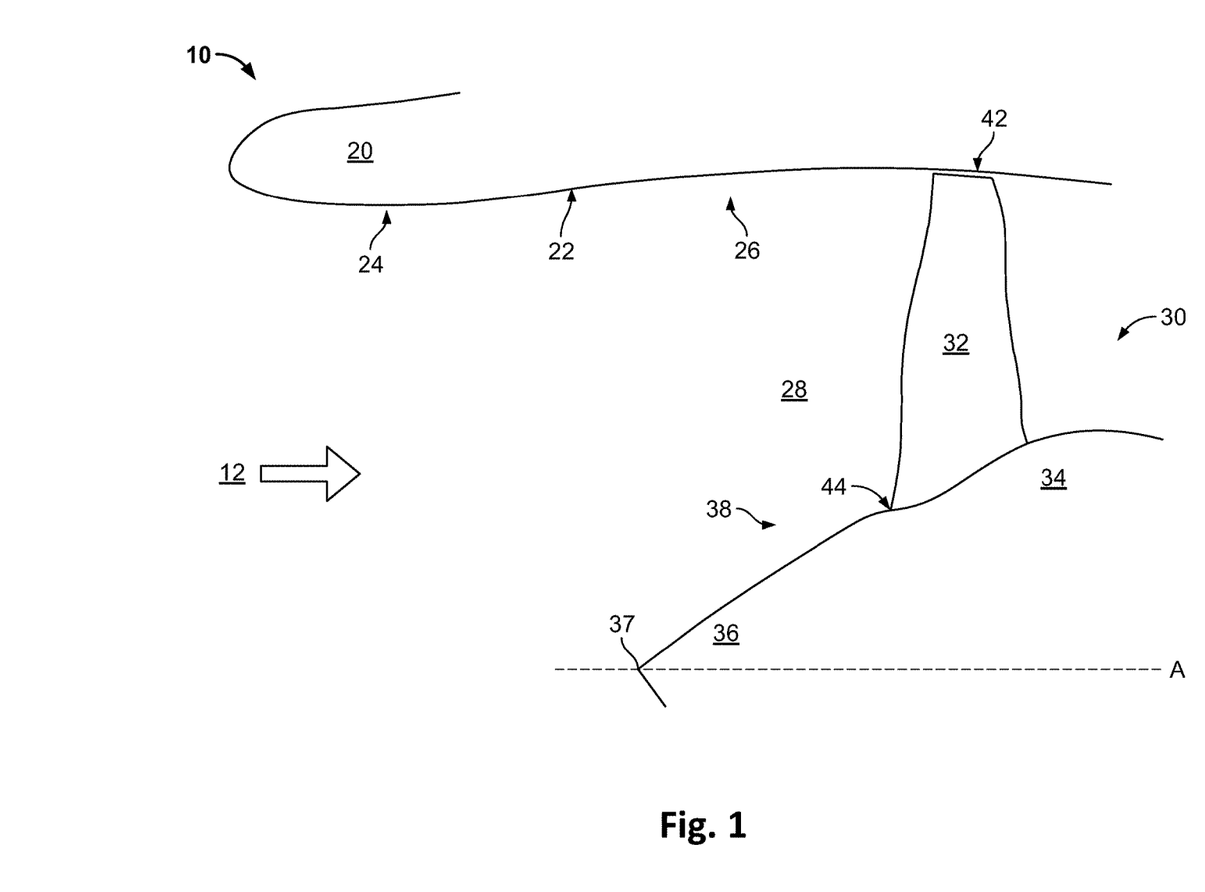
FIG. 1 is a side cutaway view of an inlet region of a typical turbofan engine.

FIG. 1 is a side cutaway view of an inlet region 10 of a typical turbofan engine. Inlet region 10 comprises a nacelle 20 and fan 30. Nacelle 20 comprises an annular inner surface 22 which, together with fan 30, defines an air flow path 28 (or air passage or annular duct) for air entering the inlet region 10 and flowing axially through the turbine engine. Air flow is represented by arrow 12. Air flow path 28 is upstream and co-axial with fan 30. Nacelle 20 further comprises a upstream region 24 and downstream region 26, with upstream region 24 having a smaller inner diameter than downstream region 26. In other words, upstream region 24 is contracted compared to downstream region 26.

Fan 30 comprises a plurality of fan blades 32 arranged circumferentially about and extending radially away from a fan rotor 34. A spinner 36 is connected axially forward of fan rotor 34 and terminates at spinner tip 37. An axis of rotation A for fan 30 is depicted through fan rotor 34 and spinner 36, which are co-axial. Each blade 32 of the plurality of blades comprises a blade tip 42 disposed radially outward from blade root 44 proximate spinner 36 or rotor 34. In some embodiments fan 30 is referred to as a propulsion fan or inlet fan. In some embodiments the combination of rotor 34 and spinner 36 is referred to as hub 38. In some embodiments the blade tip 42 is circumferentially offset from the blade root 44 in a direction consistent with or opposite from the direction of fan 30 rotation.

In a typical turbofan engine such as that illustrated in FIG. 1, pressure waves generated by blade vibration propagate in an axially forward direction from fan blades 32. Due to blade rotation, those pressure waves propagate in an axially forward direction as well as circumferentially. Those pressure waves can be called acoustic waves or acoustic reflection, whereby acoustic waves reflect off various inlet region surfaces. Manipulating such reflections, and thus interrupting the reflected acoustic waves that can aggregate the flutter event, is an important design goal of a turbine engine.

Figure 2:
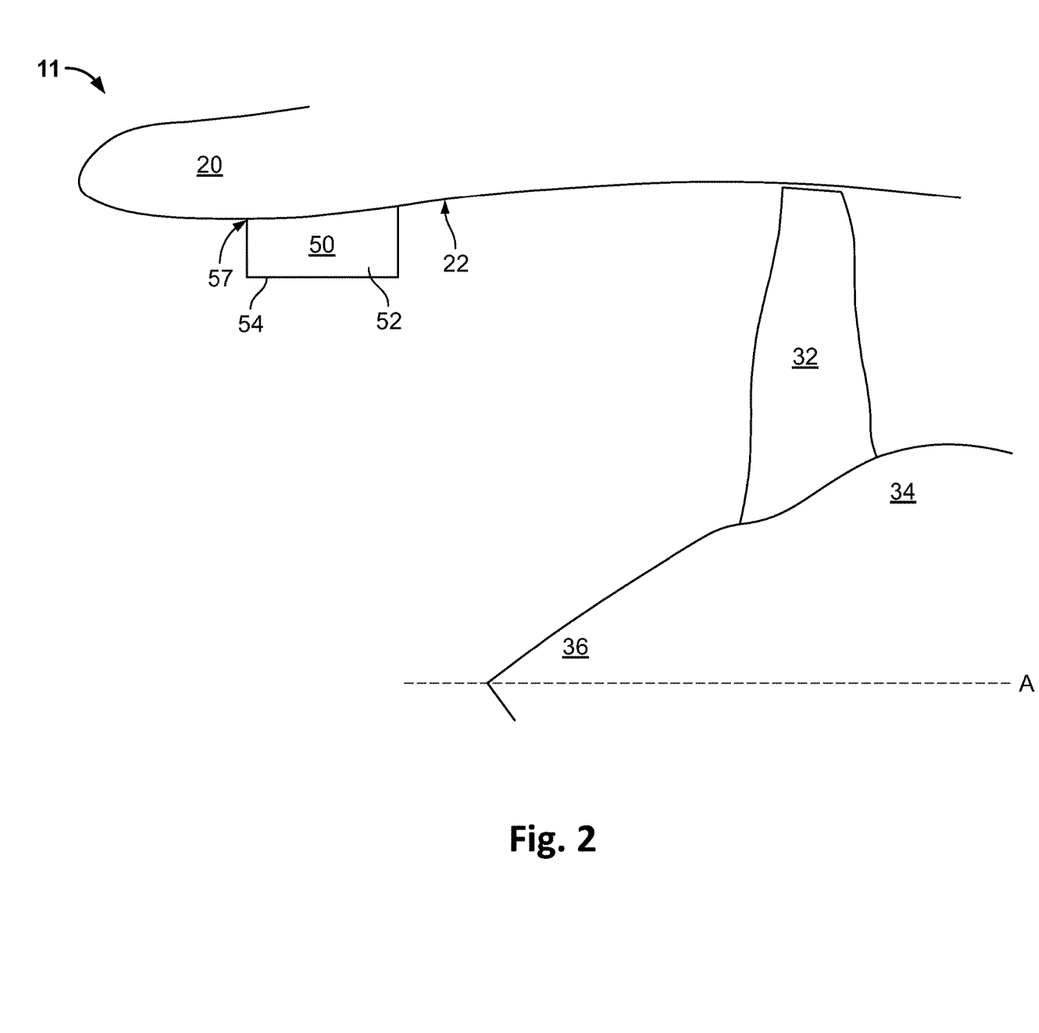
FIG. 2 is a side cutaway view of a modified inlet region of a turbofan engine having acoustic reflection interrupting fins in accordance with some embodiments of the present disclosure.

FIG. 2 is a side cutaway view of a modified inlet region 11 in accordance with some embodiments of the present disclosure. Modified inlet region 11 comprises a nacelle 20 and fan 30 as described with reference to FIG. 1 above. Modified inlet region 11 further comprises a plurality of fins 50 disposed circumferentially around and attached to annular inner surface 22 of nacelle 20. Each fin 50 of the plurality of fins comprises a pair of axially-extending surfaces 52 which, in some embodiments, are parallel to axis A. In other embodiments each fin 50 is axially aligned at an angle relative to axis A but in any case aligned with air flow 12. Each fin 50 of the plurality of fins extends radially inward from a fin root 57 at annular inner surface 22 into air flow path 28 and terminates at a free end 54.

In some embodiments the number of fins 50 in said plurality of fins is equal to the number of fan blades 32. In some preferred embodiments the number of fins 50 in said plurality of fins is less than or equal to one half of the number of fan blades 32. In some embodiments the number of fins 50 in said plurality of fins is greater than or equal to one half of the number of fan blades 32.

In some embodiments the plurality of fins 50 are attached to annular inner surface 22 at the upstream portion 24, as shown in FIG. 2. In other embodiments, the plurality of fins 50 are attached to annular inner surface 22 at the downstream portion 26. In all embodiments the plurality of fins 50 are attached to annular inner surface 22 upstream of fan blades 32. Thus the plurality of fins 50 are attached at any axial location along annular inner surface 22 upstream of fan blades 32.

Although the fin 50 illustrated in FIG. 2 is generally rectangular in shape, in some embodiments additional fin 50 shapes are contemplated such as triangular, trapezoidal, tapered swept trapezoid, or a compound of these shapes. Additionally, in some embodiments fin 50 will radially extend further into or less into air flow path 28.

The plurality of fins 50 serve to interrupt acoustic reflections which can lead to fan flutter. As explained above, such acoustic reflections typically propagate upstream of fan blades 32 in both an axial and circumferential direction. Fins 50 therefore interrupt propagation in the circumferential direction, resulting in an altered phase such that subsequently reflected waves are not in-phase with pressure oscillations at the blade surface.

Prevention of in-phase reflections has a damping effect and therefore reduces or even eliminates the severity of fan flutter at certain rotational speeds of fan blades 32. In some embodiments, acoustic waves generated by the rotation of the plurality of fan blades 32 are reflected off fins 50 back towards hub 38. In some embodiments, acoustic waves generated by the rotation of the plurality of fan blades 32 are reflected off fins 50 in a manner such that they destructively interfere with acoustic waves proximate the fan blades 32.

Because fins 50 are generally aligned with axis of rotation A, their impact to air flow through the modified inlet region 11 is minimal. Turbine engine performance characteristics for a modified inlet region 11 are discussed further with respect to FIGS. 5-7 below.

Figure 3:
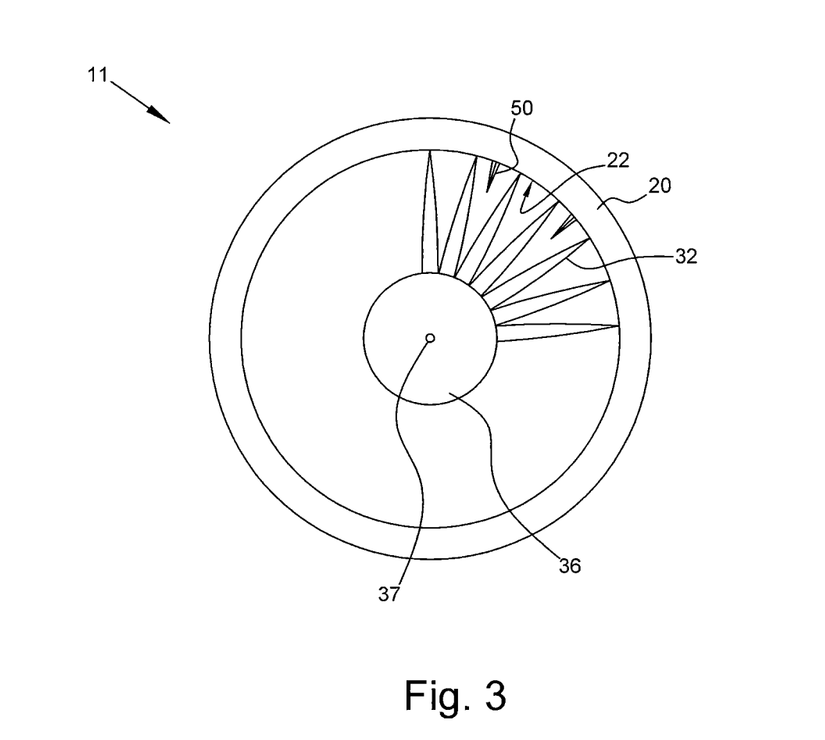
FIG. 3 is a front profile view of a modified inlet region of a turbofan engine having acoustic reflection interrupting fins in accordance with some embodiments of the present disclosure.

FIG. 3 is a front profile view of a modified inlet region 11 having a plurality of fins 50 in accordance with some embodiments of the present disclosure. A plurality of fan blades 32 are shown disposed circumferentially around spinner 36. A nacelle 20 is located axially forward from the plurality of fan blades 32 and includes a plurality of fins 50 attached to an annular inner surface 22. As depicted in FIG. 3, in some embodiments each fin 50 is attached normal to annular inner surface 22.

Figure 4:
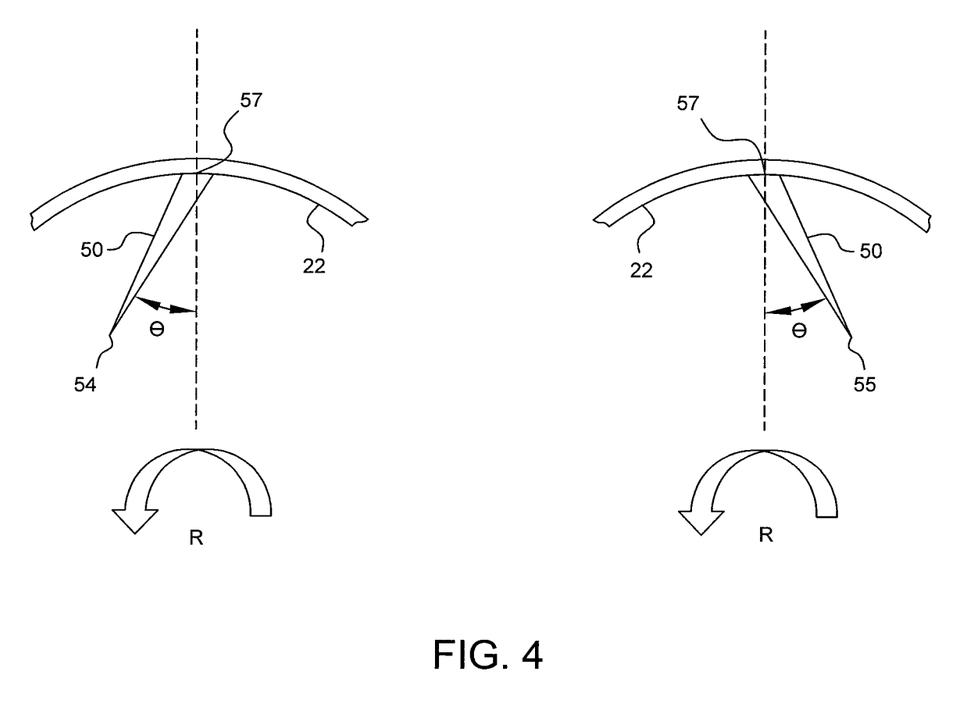
FIG. 4 is a partial front profile view of a modified inlet region of a turbofan engine having acoustic reflection interrupting fins in accordance with some embodiments of the present disclosure.

FIG. 4 is a partial front profile view of a modified inlet region 11 having a plurality of fins 50 in accordance with some embodiments of the present disclosure. As shown in FIG. 4, in some embodiments each fin 50 is attached to annular inner surface 22 at an angle θ relative to a radius r of the annular inner surface 22 of nacelle 20. FIG. 4 additionally illustrates the direction of rotation R of the plurality of fan blades 32. The angle θ may be positive as shown in FIG. 4, or negative such as when the fins are angled opposite the direction of rotation of fan blades 32, which results in some embodiments where the fin tip 54 is circumferentially offset from the fin root 57 in a direction consistent with or opposite from the direction of fan 30 rotation R.

Figure 5A:
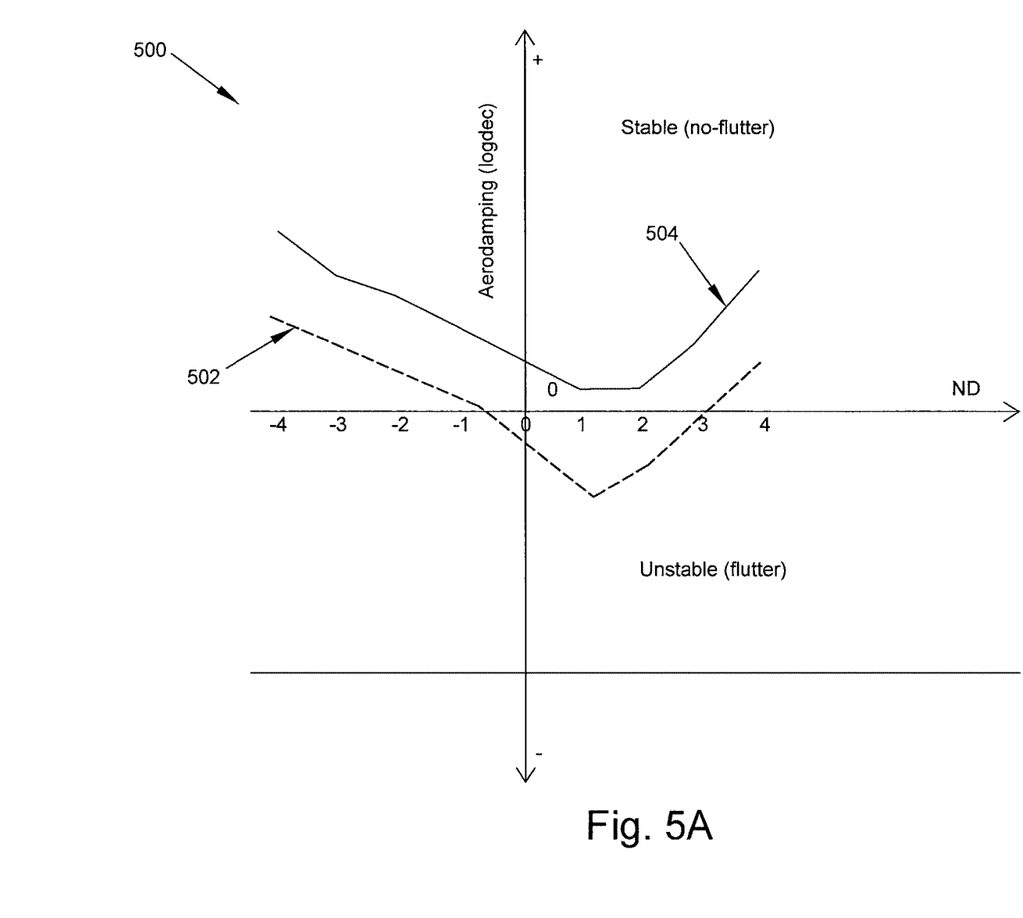
FIGS. 5A and 5B provide performance graphs depicting how the flutter performance of a turbofan engine fan is evaluated using computer simulations.

FIG. 5A provides a performance graph 500 depicting an engine fan with and without flutter during operation. The x-axis of graph 500 tracks nodal diameter (ND), which is a number defining the pattern that fan blades follow while they vibrate. To be flutter-free, the aerodamping value along the y-axis must be above zero for all ND values. Using aeroelasticity simulations, aerodamping values are determined from modal displacement histories. Aerodamping is calculated by the following equation:

$$\text{Aerodamping (Logdec)} = \text{LOG\_e}(A_x/(A_{x+1}))$$

LOG_e is the natural logarithmic function. $A_x$ is the magnitude of modal displacement at cycle x, while "$A_{x+1}$" is the magnitude of modal displacement at cycle x±1.

The aerodamping value is positive when the modal displacement magnitude is decreasing with time, while the aerodamping value is negative when the modal displacement magnitude is increasing with time.

FIG. 5A provides a first performance curve 502 in which aerodamping is less than zero for ND between −1 and 3. This indicates the potential for flutter. In contrast, second performance curve 504 shows positive (greater than zero) aerodamping for all ND, indicating stable, non-flutter fan performance.

Figure 5B:
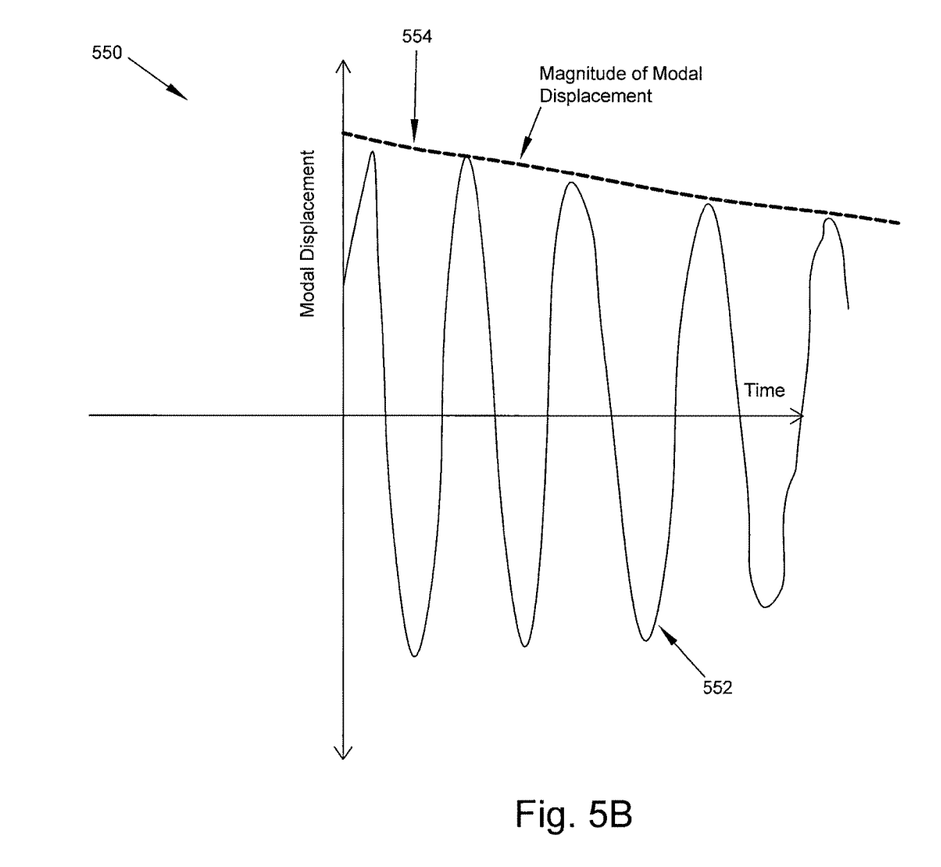

FIG. 5B provides a performance graph 550 depicting a modal displacement history. The magnitude of modal displacement (y-axis) is tracked over time (x-axis) to determine trends in modal displacement. The magnitude of modal displacement oscillation curve 552 is decreasing over time, as indicated by negatively sloped modal displacement history curve 554. This curve 554 indicates positive aerodamping and therefore stable, non-flutter fan performance.

Figure 6:
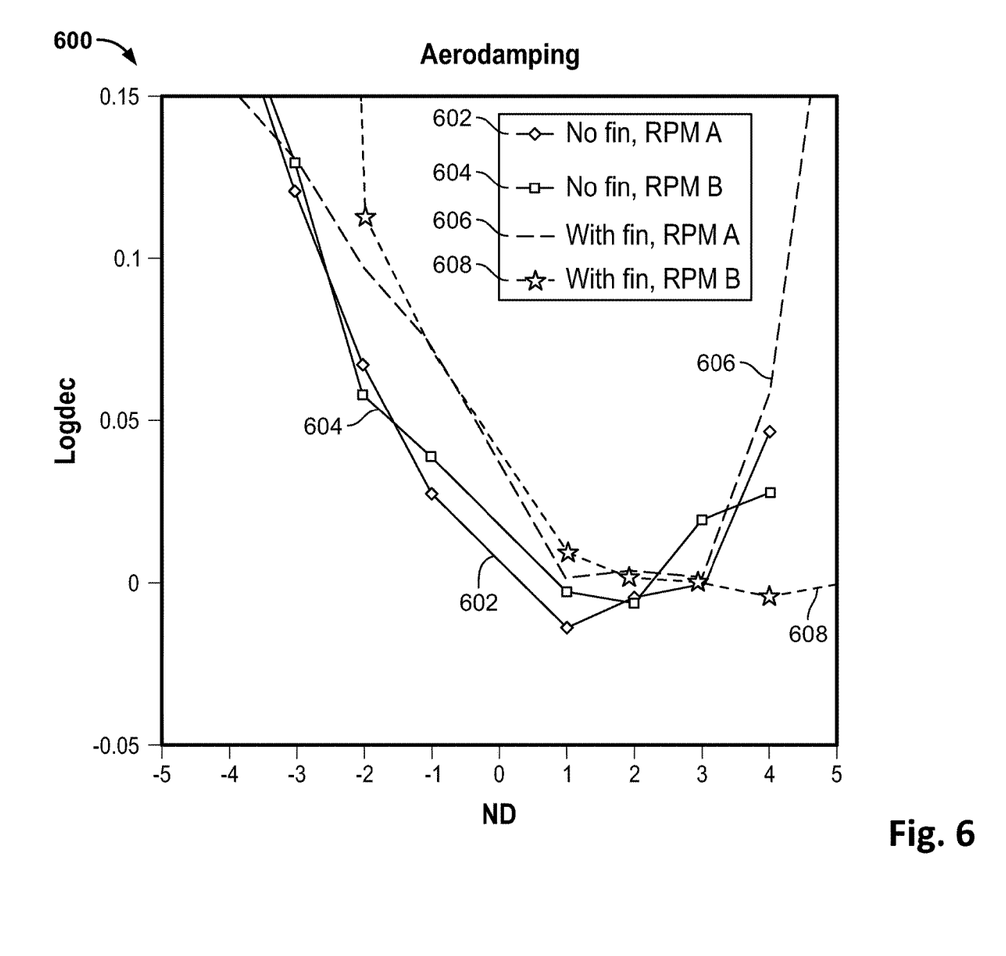
FIG. 6 provides a performance graph depicting improved operating characteristics achieved by a turbofan engine having acoustic reflection interrupting fins in accordance with some embodiments of the present disclosure.

FIG. 6 provides a performance graph 600 depicting improved operating characteristics achieved by a turbofan engine having acoustic reflection interrupting fins 50 in accordance with some embodiments of the present disclosure. More specifically, the graph 600 of FIG. 6 illustrates improved aerodamping provided by a modified inlet region 11 with fins 50.

FIG. 6 presents four aerodamping curves (602, 604, 606, and 608). Two of those curves (602, 604) are for inlet regions 10 without fins and two of those curves (606, 608) are for modified inlet regions 11 with fins 50. Two of those curves (602, 606) are for fan blades 32 rotating at a first rotational speed (RPM A) and two of those curves (604, 608) are for fan blades 32 rotating at a second rotational speed (RPM B). As is depicted in FIG. 6, the addition of fins 50 improves aerodamping for a certain fan design by positively increasing the aerodamping for each nodal diameter and specifically moving the aerodamping into the positive region (save ND 3 and 4).

Figure 7A:
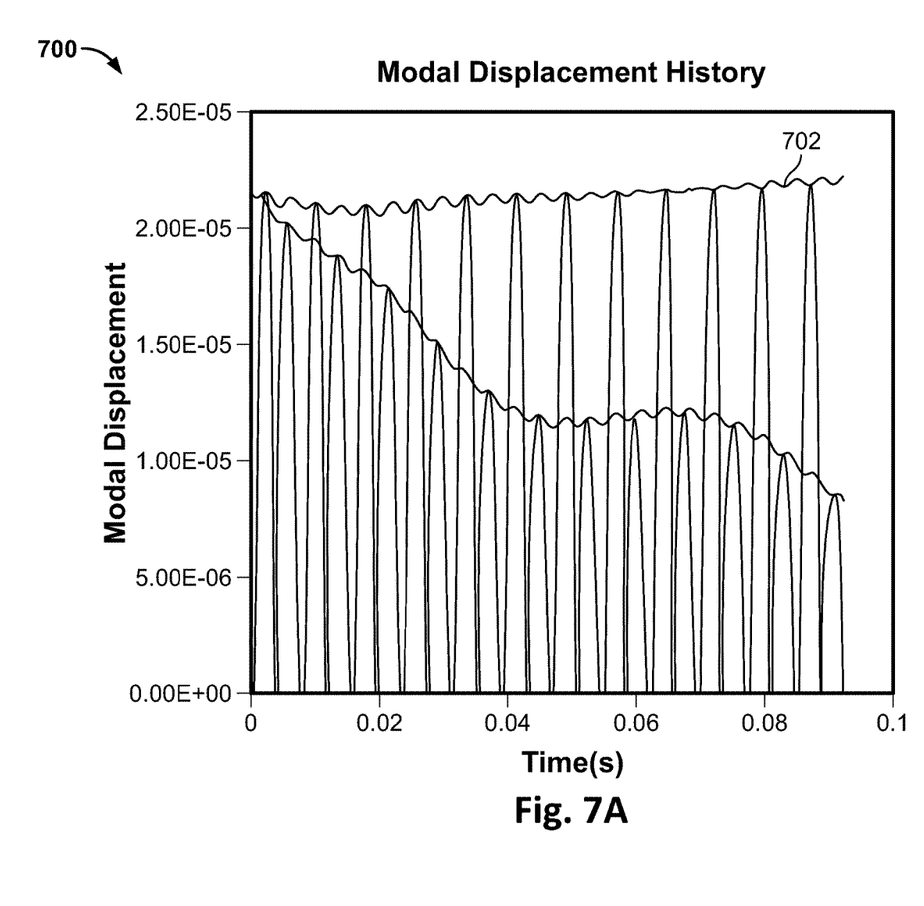
FIGS. 7A and 7B provide performance graphs 700, 750 of modal displacement histories for a typical turbine engine.
Figure 7B:
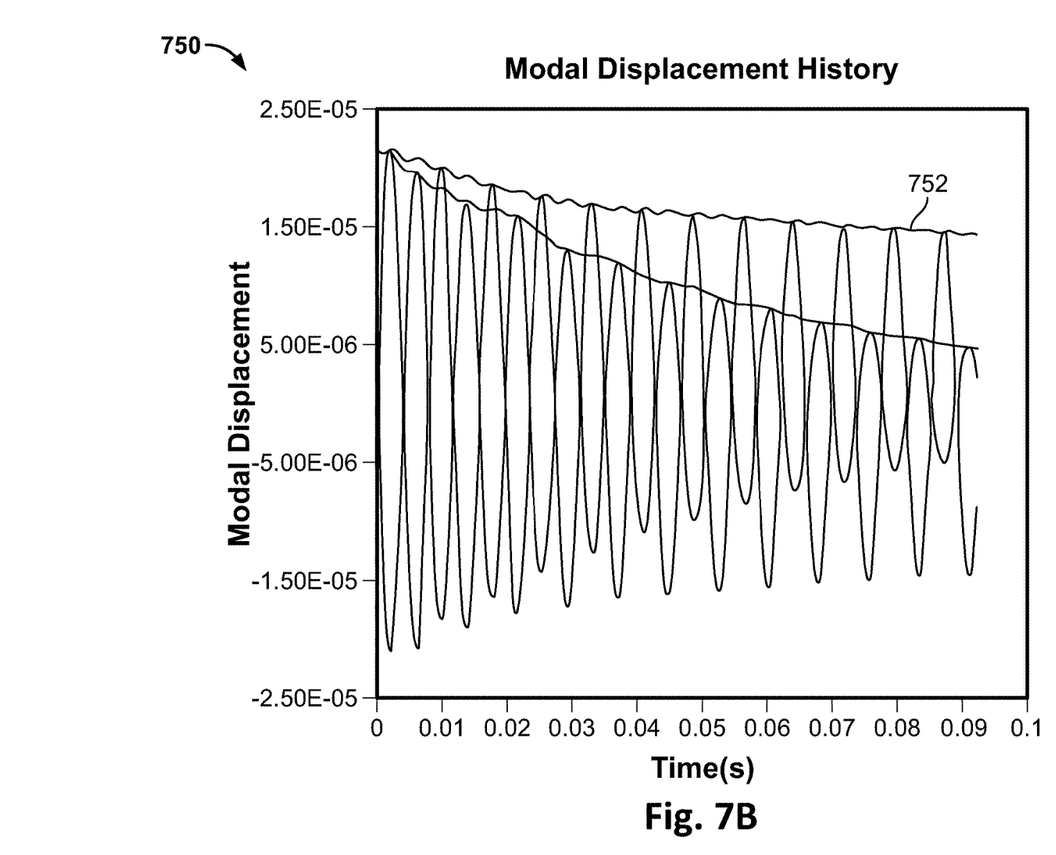

FIGS. 7A and 7B provide performance graphs 700, 750 of modal displacement histories for a typical turbine engine fan. FIG. 7A shows a curve 702 indicating increasing modal displacement amplitudes over time, which represents fan flutter. In contrast, FIG. 7B shows a curve 752 indicating decreasing modal displacement amplitudes over time, which represents an increased margin to fan flutter.

Figure 8A:
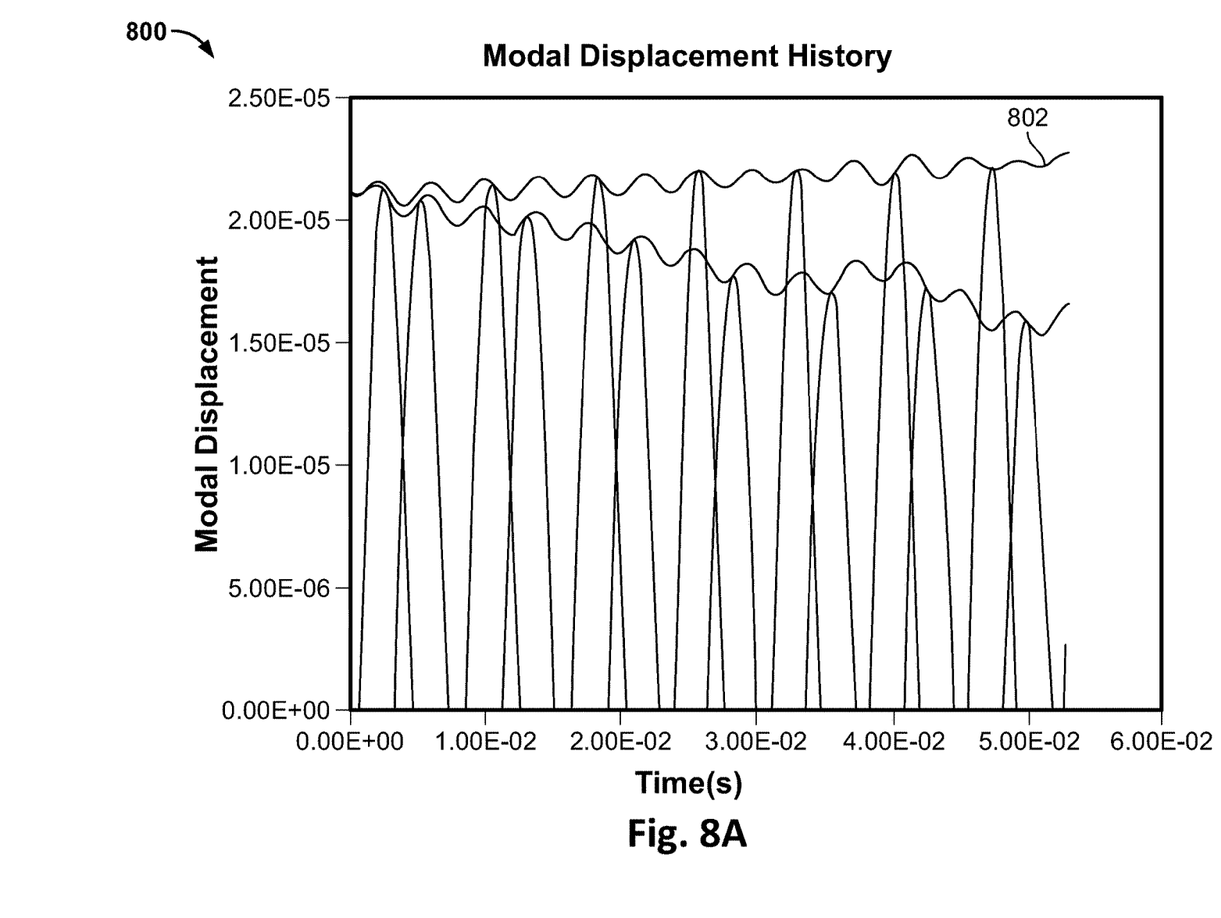
FIG. 8A provides a performance graph depicting operating characteristics of a turbofan engine having an inlet region without fins.

FIG. 8A provides a performance graph 800 depicting operating characteristics of a turbofan engine having an inlet region 10 without fins 50. The engine performance measured in FIG. 8A is at a steady rotational speed of fan 30 and a specific fan design. Curve 802 illustrates increasing modal displacement amplitudes over time, indicating fan flutter is likely to occur for this fan design at the measured rotational speed.

Figure 8B:
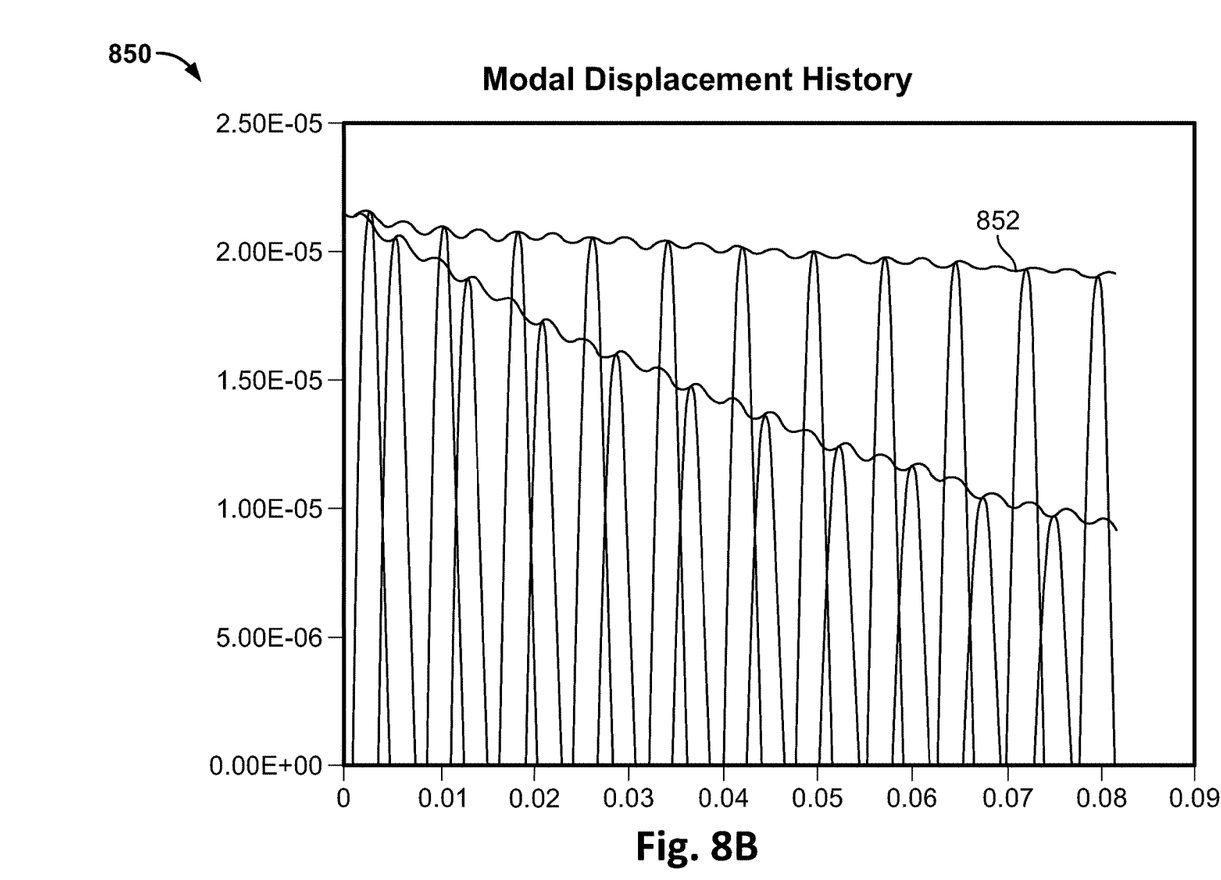
FIG. 8B provides a performance graph depicting improved operating characteristics achieved by a turbofan engine having a modified inlet region with acoustic reflection interrupting fins in accordance with some embodiments of the present disclosure.

FIG. 8B provides a performance graph 850 depicting improved operating characteristics achieved by a turbofan engine having a modified inlet region 11 with acoustic reflection interrupting fins 50 in accordance with some embodiments of the present disclosure. The engine performance illustrated in FIG. 8B is at the same steady rotational speed of fan 30 and for the same specific fan design as that in FIG. 8A. However, with the addition of fins 50 it can be seen that curve 852 shows decreasing modal displacement amplitudes over time, which represents an increased margin to fan flutter achieved by fins 50. Curve 852 thus shows the positive impact of interrupting the acoustic reflections using fins 50, namely the decreasing modal displacement amplitudes leading to improved flutter margin.

The disclosed modified inlet region with acoustic reflection interrupting fins provides numerous advantages over the prior art. First and foremost, interrupting the circumferential acoustic reflections which can lead to fan flutter results in increased flutter margin and decreased chances of damage or destruction of a turbine engine due to flutter. Maintenance (such as sharpening a fan blade leading edge) and operational constraints (such as keep-out zones) which are designed to protect against fan flutter may be reduced or eliminated. The modified inlet region as disclosed carries only a small weight penalty—the minimal weight of the fins—and has a minimal impact on air flow through the air flow path of the turbine engine.

The present application discloses one or more of the features recited in the appended claims and/or the following features which, alone or in any combination, may comprise patentable subject matter.

According to an aspect of the present disclosure, a turbofan engine comprises an air passage defined by an annular inside surface and a fan, the air passage being upstream and co-axial with the fan, and the fan having a plurality of blades extending radially away from the axis and a hub co-axial with the axis, each of the plurality of blades having a blade tip radially disposed from the blade root proximate the hub, and a plurality of fins disposed circumferentially around the inside surface of the air passage, each of the plurality of fins affixed to the inside surface, extending into the air passage and terminating with a free end.

In some embodiments each of the fins are normal to the inside surface. In some embodiments each fin of the plurality of fins is oblique to the inside surface. In some embodiments the plurality of fins comprises a number of fins less than half the number of fan blades. In some embodiments each of the plurality of fins a fin root proximate to the inside surface and fin tip proximate the free end, and the fin tip is offset circumferentially from the fin root in a direction of fan rotation. In some embodiments each of the plurality of fins a fin root proximate to the inside surface and fin tip proximate the free end, and the fin tip is offset circumferentially from the fin root in a direction opposite of fan rotation. In some embodiments each fin comprises a pair of axially-extending surfaces which are parallel to the axis. In some embodiments the air passage contracts at an upstream portion of the passage. In some embodiments the plurality of fins are positioned downstream of the upstream portion.

According to another aspect of the present disclosure, an annular duct with a propulsion fan having a plurality of fan blades circumferentially arranged around a hub within the duct, a method of reducing flutter of the fan blades comprises arranging a plurality of fins circumferentially inside the duct upstream of the fan; and reflecting acoustic waves off of the plurality of fins, wherein the acoustic waves were generated by the plurality of fan blades.

In some embodiments the acoustic waves are reflected towards the hub. In some embodiments the reflected waves destructively interfere with the acoustic waves proximate the fan blades. In some embodiments the plurality of fins is equal or less than half the plurality of fan blades. In some embodiments each of the plurality of fins are oblique to an inside surface of the duct and parallel to an axis of rotation of the fan. In some embodiments each of the plurality of fins are normal to an inside surface of the duct and parallel to an axis of rotation of the fan.

According to another aspect of the present disclosure, an apparatus comprises an annular surface defining a fluid passage, wherein fluid flows from upstream to downstream within the fluid passage, a plurality of fins positioned circumferentially about the annular surface; each of the plurality of fins extends radially from a root attached to the annular surface and terminates at a free end in the fluid passage; and wherein the fins are oriented parallel to the flow.

In some embodiments each of the fins are normal to the annular surface proximate the root. In some embodiments each of the fins are oblique to the annular surface proximate the root. In some embodiments the apparatus further comprises a fan, the fluid passage being upstream and co-axial with the fan, and the fan having a plurality of blades arranged radially around the axis and a spinner co-axial with the axis, each of the plurality of blades having a blade tip radially disposed from the blade root proximate the spinner. In some embodiments the number of the plurality of fins is equal to the number of the plurality of fan blades.

Although examples are illustrated and described herein, embodiments are nevertheless not limited to the details shown, since various modifications and structural changes may be made therein by those of ordinary skill within the scope and range of equivalents of the claims.

What is claimed is:

1. A turbofan engine comprising:
   an air passage defined by an annular inside surface and a fan, the air passage being upstream and co-axial with the fan, and the fan having a plurality of blades extending radially away from the axis and a hub co-axial with the axis, each of the plurality of blades having a blade tip radially disposed from the blade root proximate the hub; and
   a plurality of fins disposed circumferentially around the inside surface of the air passage, each of the plurality of fins affixed to the inside surface, extending into the air passage and terminating with a free end,
   wherein a central plane of each fin of said plurality of fins is at an acute angle to the inside surface.

2. The turbofan engine of claim 1, wherein said plurality of fins comprises a number of fins less than half the number of fan blades.

3. The turbofan engine of claim 1, wherein each of the plurality of fins comprise a fin root proximate to the inside surface and a fin tip proximate the free end, and the fin tip is offset circumferentially from the fin root in a direction of fan rotation.

4. The turbofan engine of claim 1, wherein each of the plurality of fins comprise a fin root proximate to the inside surface and a fin tip proximate the free end, and the fin tip is offset circumferentially from the fin root in a direction opposite of fan rotation.

5. In an annular duct with a propulsion fan having a plurality of fan blades circumferentially arranged around a hub within the duct, a method of reducing flutter of the fan blades comprising:
   arranging a plurality of fins circumferentially inside the duct upstream of the fan; and reflecting acoustic waves off of the plurality of fins, wherein the acoustic waves were generated by the plurality of fan blades, wherein the acoustic waves are reflected towards the hub,
   wherein a central plane of each of the plurality of fins is at an acute angle to an inside surface of the duct and parallel to an axis of rotation of the fan.

6. The method of claim 5, wherein the plurality of fins is equal or less than half the plurality of fan blades.

7. An apparatus comprising:
   an annular surface defining a fluid passage; wherein fluid flows from upstream to downstream within the fluid passage,
   a plurality of fins positioned circumferentially about the annular surface; each of the plurality of fins extends radially from a root attached to the annular surface and terminates at a free end in the fluid passage; and wherein the fins are oriented parallel to the flow;
   further comprising a fan, the fluid passage being upstream and co-axial with the fan, and the fan having a plurality of blades arranged radially around the axis and a spinner co-axial with the axis, each of the plurality of blades having a blade tip radially disposed from the blade root proximate the spinner;
   wherein the number of said plurality of fins is less than or equal to the number of said plurality of fan blades,
   wherein a central plane of each of the fins is at an acute angle to the annular surface proximate the root.

* * * * *